United States Patent [19]

Smith

[11] Patent Number: 5,482,304
[45] Date of Patent: Jan. 9, 1996

[54] BICYCLE ATTACHMENT FOR TRAILERING A PULL-TYPE GOLF CART

[76] Inventor: Philip S. Smith, 362 Woodhill Dr., Huntington, Carroll County, Tenn. 38344

[21] Appl. No.: 258,655

[22] Filed: Jun. 10, 1994

[51] Int. Cl.⁶ .................................................. B62K 27/00
[52] U.S. Cl. ...................... 280/204; 280/DIG. 6
[58] Field of Search .................... 280/204, 202, 280/292, 288.4, 495, 496, DIG. 6

[56] References Cited

U.S. PATENT DOCUMENTS

| 3,827,613 | 8/1974 | Meyer | 224/40 |
|---|---|---|---|
| 3,877,723 | 4/1975 | Fabey et al. | 280/204 |
| 4,371,184 | 2/1983 | Henden et al. | 280/204 |
| 4,431,205 | 2/1984 | Speicher et al. | 280/282 |
| 4,759,559 | 7/1988 | Moulton | 280/40 |
| 4,770,326 | 9/1988 | Thompson | 224/39 |
| 4,848,504 | 7/1989 | Olson | 180/191 |
| 5,005,847 | 4/1991 | King et al. | 280/47.19 |
| 5,020,813 | 6/1991 | Gottschalk | 280/204 |
| 5,098,113 | 3/1992 | Albitre | 280/204 |
| 5,232,065 | 8/1993 | Cotton | 180/11 |
| 5,259,634 | 11/1993 | Berner et al. | 280/204 |

FOREIGN PATENT DOCUMENTS

| 867444 | 10/1941 | France | 280/204 |
|---|---|---|---|
| 3923998 | 2/1990 | Germany | 280/204 |

Primary Examiner—Kevin T. Hurley
Attorney, Agent, or Firm—Pitts & Brittian

[57] ABSTRACT

A trailering device (10) for being secured between a bicycle (12) and a pull-type golf cart (16) such that as the bicycle (12) is ridden, the pull-type golf cart (16) is pulled behind. The trailering device (10) includes a connecting rod (26), a bicycle attachment member (32) secured at one end of the connecting rod (26), and a golf cart attachment member (54) secured to another end of the connecting rod (26). The bicycle attachment member (32) is releasably securable to the bicycle seat post (14) and the golf cart attachment member (54) is releasably securable to the golf cart (16) at the frame (18) or handle (20).

20 Claims, 3 Drawing Sheets

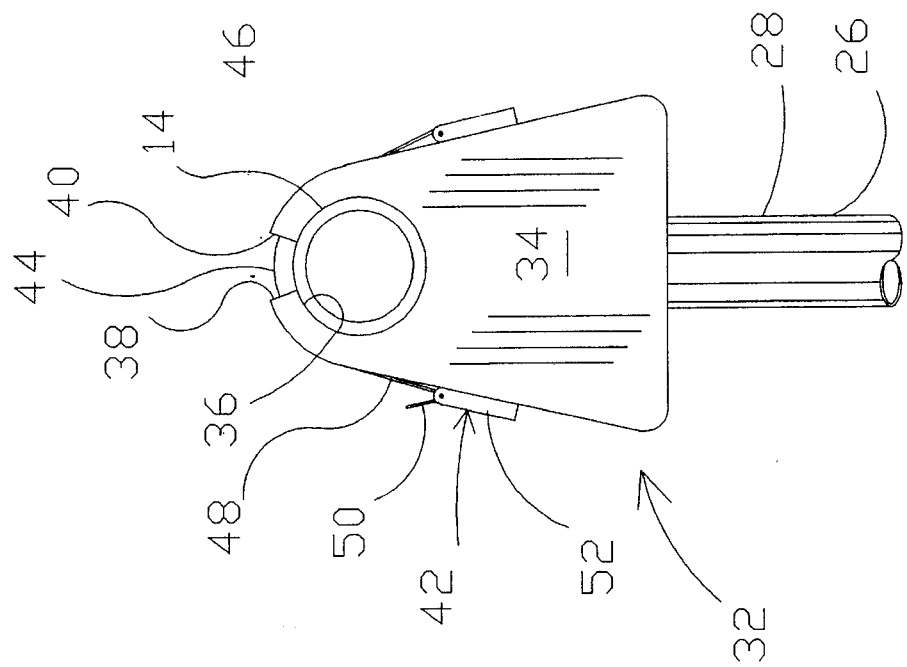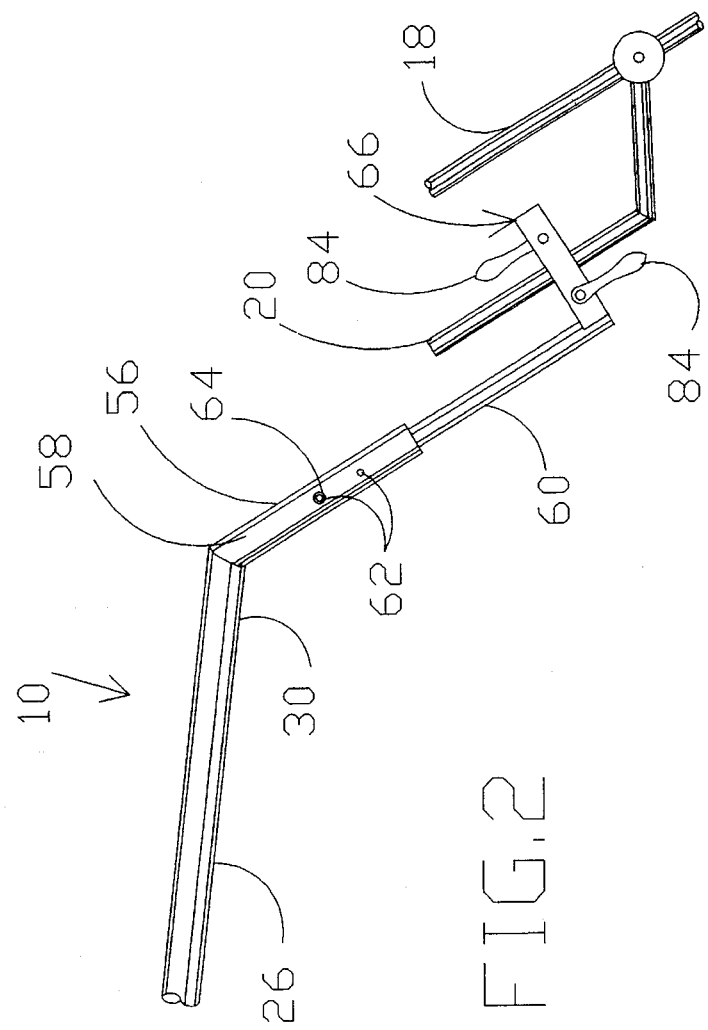

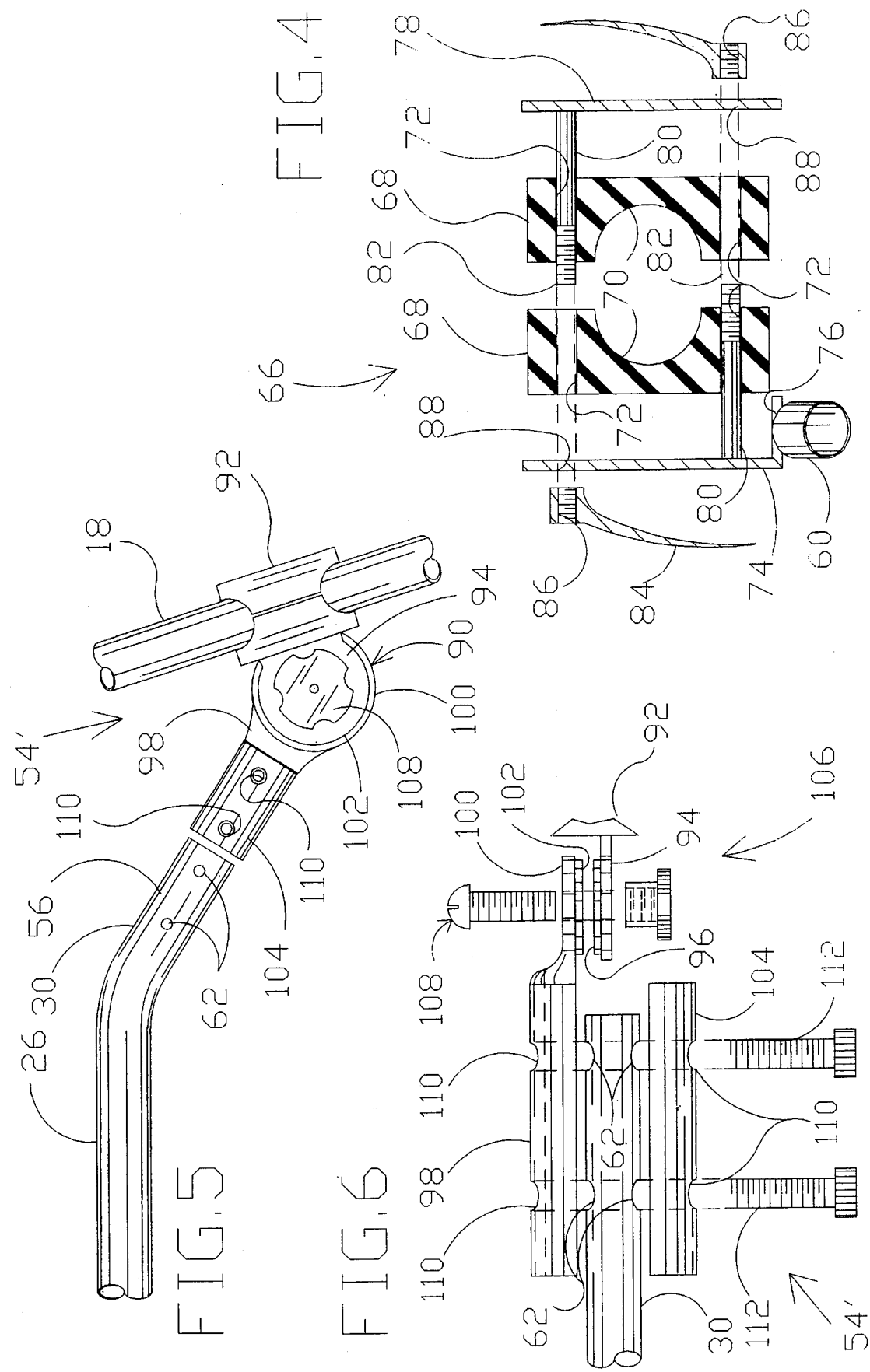

5,482,304

BICYCLE ATTACHMENT FOR TRAILERING A PULL-TYPE GOLF CART

TECHNICAL FIELD

This invention relates to the field of golf. More specifically, the present invention relates to a device for securing a pull-type golf cart to a bicycle such that the golf cart is pulled when the bicycle is ridden.

BACKGROUND ART

In the field of golf, it is well known that there are many ways of transporting golf clubs while playing. To this extent, it is also well known that most players of the game have a set of clubs for use in different situations and, more particularly, different distances to the hole. Most golfers keep their golf clubs and other miscellaneous accessories in a golf bag which is carried over the shoulder, on a pull-type golf cart, or on a motorized golf cart also used for transporting golfers.

To many golfers, exercise is a desired benefit of playing the game. Therefore, the latter-mentioned method of transporting golf clubs may not be desirable for all golfers. In the other two typical methods, the golfer must exercise to a greater extent to move from one shot to the next but at the same time is faced with the awkward task of either carrying the golf bag, pushing it in front of him/her, or pulling it behind him/her.

Other devices have been produced to carry golf clubs or other items while still providing the benefit of exercise. Still other devices have been produced for trailering selected articles without the benefit of physical exercise. Typical of the art are those devices disclosed in the following U.S. Patents:

| U.S. Pat. No. | Inventor(s) | Issue Date |
| --- | --- | --- |
| 3,827,613 | M. C. Meyer | Aug 6, 1974 |
| 4,371,184 | D. J. Henden, et al. | Feb 1, 1983 |
| 4,431,205 | J. M. Speecher, et al. | Feb 14, 1984 |
| 4,759,559 | L. A. Moulton | Jul 26, 1988 |
| 4,770,326 | C. A. Thompson | Sep 13, 1988 |
| 4,848,504 | J. H. Olson | Jul 18, 1989 |
| 5,005,847 | E. L. King, et al. | Apr 9, 1991 |
| 5,020,813 | P. J. Gottschalk | Jun 4, 1991 |
| 5,098,113 | E. E. Albitre | Mar 24, 1992 |
| 5,232,065 | J. T. Cotton | Aug 3, 1993 |

Of these devices, those disclosed by Henden, et al. ('184); King, et al. ('847); Gottschalk ('813); and Albitre ('113) are wheeled devices which may be secured to the seat post of a bicycle and pulled as the bicycle is ridden. Specifically, the '184 and '113 patents are directed toward a trailer for carrying unspecified items. The '847 device is particularly suited for carrying fishing paraphernalia and the '813 device is particularly suited for carrying children or other cargo.

The '326 device disclosed by Thompson is securable to a bicycle and is provided with a plurality of tubes, each for receiving the shaft of a golf club. However, the '326 device does not provide for the carrying of a conventional golf bag.

Those devices disclosed by Olson ('504) and Cotton ('065) are directed toward motorized attachments or conversion units for transporting conventional pull-type golf carts. The '504 device further provides a platform upon which the golfer may stand when the device is being operated, thus providing transportation for the golfer as well as the clubs.

The remaining devices teach the notion of transporting a conventional golf bag while riding a bicycle or similar device. The '613 device taught by Meyer is a rack which is secured to a bicycle and which is configured to receive the golf bag for transport. The '205 device taught by Speicher, et al., is a three-wheeled, man-powered golf cart provided with a bracket for supporting the golf bag and a strap for securing the golf bag to the golf cart. Finally, the '559 device taught by Moulton is a trailer for being secured to a bicycle and for carrying any selected article of a particular maximum size and weight. Specifically illustrated by Moulton in one embodiment is the use of the device for carrying a golf bag. However, the device is clearly not limited to this use. Further, Moulton does not disclose any means for securing the golf bag to the carrier, thus apparently allowing for the golf bag to fall out of the carrier if the carrier is tilted to an extreme or if the carrier is driven over a substantial bump or hole.

Therefore, it is an object of this invention to provide a means for pulling a pull-type golf cart under the motivation of a conventional bicycle.

Further, it is an object of the present invention to provide such a means which may be adapted to be secured between the frame of any conventional pull-type golf cart and any conventional bicycle.

DISCLOSURE OF THE INVENTION

Other objects and advantages will be accomplished by the present invention which serves to trailer pull-type golf carts behind a bicycle. The bicycle attachment for trailering pull-type golf carts, or trailering device, is designed for being secured between a bicycle and a pull-type golf cart such that as the bicycle is ridden, the pull-type golf cart is pulled behind. The trailering device is comprised generally of a connecting rod, a bicycle attachment member secured at one end of the connecting rod, and a golf cart attachment member releasably secured to another end of the connecting rod.

The bicycle attachment member is provided for securing the connecting rod to the bicycle seat post such that the connecting rod is capable of pivoting around the axis of the bicycle seat post. The bicycle attachment member includes a mounting block and a locking mechanism. The mounting block is releasably securable to the bicycle seat post and is secured to one end of the connecting rod. The locking mechanism is provided for preventing unselected removal of the mounting block from the bicycle seat post.

The golf cart attachment member is provided for releasably securing the connecting rod to the golf cart at a selected location. The golf cart attachment member is releasably securable to the connecting rod via a pair of telescoping members, one of which is secured to the connecting rod, the other being secured to a clamping assembly. The clamping assembly is in turn releasably secured to the golf cart. Typically, the clamping assembly is secured to the golf cart frame or the golf cart handle.

In an alternate embodiment, the golf cart attachment member is carried by the golf cart frame for the intended purpose of securing a handle thereto. In this embodiment, the golf cart handle is removed from the attachment device and is replaced by the connecting rod.

BRIEF DESCRIPTION OF THE DRAWINGS

The above mentioned features of the invention will become more clearly understood from the following detailed description of the invention read together with the drawings in which:

FIG. 2 is an elevation view of the attachment device illustrated in FIG. 1 showing an alternate location on the golf cart for securing the attachment device of the present invention;

FIG. 3 is a top plan view of the bicycle frame attachment member used in accordance with the present invention;

FIG. 4 illustrates an exploded top plan view of the golf cart attachment member used in accordance with the present invention;

FIG. 5 is a partially exploded elevation view of an alternate embodiment of the attachment device of the present invention showing an alternate attachment member carried by the golf cart for securing the attachment device of the present invention; and FIG. 6 is an exploded partial top plan view of the embodiment shown in FIG. 5.

BEST MODE FOR CARRYING OUT THE INVENTION

Figure 1:
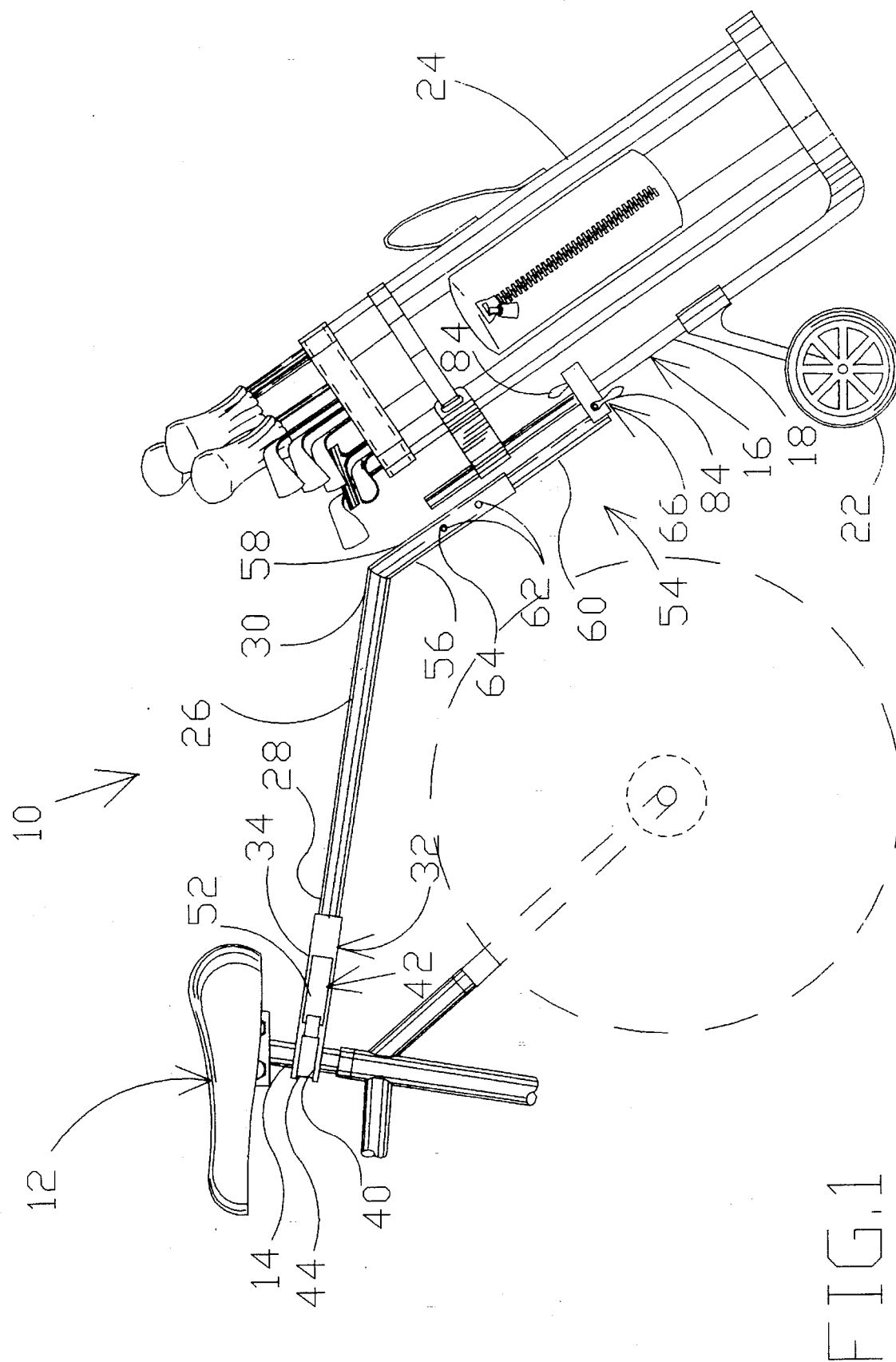
FIG. 1 is an elevation view of the bicycle attachment for trailering a pull-type golf cart constructed in accordance with several features of the present invention showing the attachment device being secured to the frame of the golf cart.

A bicycle attachment for trailering pull-type golf carts incorporating various features of the present invention is illustrated generally at 10 in the figures. The bicycle attachment for trailering pull-type golf carts, or trailering device 10, is designed for being secured between a bicycle 12 and a pull-type golf cart 16 such that as the bicycle 12 is ridden, the pull-type golf cart 16 is pulled behind.

The trailering device 10 of the present invention is comprised generally of a connecting rod 26, a bicycle attachment member 32 secured at a proximal end 28 of the connecting rod 26, and a golf cart attachment member 54 releasably secured to a distal end 30 of the connecting rod 26. In the preferred embodiment, the connecting rod 26 is fabricated from a lightweight durable material such as tubular steel or aluminum.

The bicycle attachment member 32 can be any conventional attachment member for securing the connecting rod 26 to the bicycle 12. In the preferred embodiment, the bicycle attachment member 32 is one capable of securing the connecting rod 26 to the bicycle seat post 14 and which allows the connecting rod 26 to pivot around the axis if the bicycle seat post 14. One preferred structure for the bicycle attachment member 32 is illustrated in FIG. 3. In this embodiment, the bicycle attachment member 32 is comprised of a mounting block 34 and a locking mechanism 42.

The mounting block 34 is secured to the proximal end 28 of the connecting rod 26 in a conventional manner. A through opening 36 oriented vertically is defined for receiving the bicycle seat post 14. The seat post 14 is received into the through opening 36 via a notched opening 38. The notched opening 38 is dimensioned such that the seat post 14 may be pressed through to the through opening 36 and received therein in a snap fit fashion. In order to maintain the seat post 14 within the through opening 36, the locking mechanism 42 is provided for minimizing the gap created by the notched opening 38.

To this extent, the locking mechanism 42 includes a strap member 44 secured at one end 46 to one side of the mounting block 34. A free end 48 of the strap member 44 is releasably securable to the opposite side of the mounting block 34 such that when so secured, the notched opening 38 is traversed by the strap member 44. In the preferred embodiment, the strap member free end 48 is provided with a hook 50 for engaging a clamp 52 carried by the mounting block 34. When the hook 50 engages the clamp 52 and the clamp 52 is closed, the strap member 44 is tightened around at least a portion of the perimeter of the mounting block 34. In order to prevent vertical movement of the strap member 44, a groove 40 is defined by at least the engaged portion of the perimeter of the mounting block 34.

In order to enable the mounting block 34, and hence the connecting rod 26, to pivot about the seat post 14, the cylindrical wall defining the through opening 36 is provided with a surface to minimize friction due to engagement of the seat post 14. To this extent, any conventional method may be employed. However, in the preferred embodiment, the mounting block 34 is fabricated from a plastic composition with the cylindrical wall defining the through opening 36 being a smooth surface. To enhance the pivoting of the mounting block 34 about the seat post 14, a grease compound or other lubricant may be used as well.

The golf cart attachment member 54 is provided for releasably securing the connecting rod distal end 30 to the golf cart 16 at a selected location. As illustrated in FIGS. 1 and 2, the proximal end 58 of a first telescoping member 56 is secured to the distal end 30 of the connecting rod 26 for receiving a second telescoping member 60 carried by the golf cart attachment member 54. In the illustrated embodiment, the connecting rod 26 and first telescoping member 56 are secured one to the other at an angle such that the first telescoping member 56 is oriented to receive the second telescoping member 60 carried by the golf cart attachment member 54. In an alternate embodiment, see FIG. 5, the connecting rod 26 and the first telescoping member 56 are fabricated in integral fashion, with the first telescoping member 56 being formed by bending the connecting rod distal end 30.

The second telescoping member 60 is secured to a clamping assembly 66 in an orientation such that when the clamping assembly 66 is secured to the golf cart 16, the second telescoping member 60 is secured within the first telescoping member 56, and the bicycle attachment member 32 is secured to the bicycle 12, the golf cart 16 is tilted such that it is supported on the ground solely by the golf cart wheels 22. The first and second telescoping members 56,60 are releasably secured one to the other in a conventional manner such as with a locking pin 64 received within openings 62 defined by each of the first and second telescoping members 56,60. As illustrated, the first telescoping member 56 is provided with more than one opening 62. This plurality of openings 62, in this embodiment, is provided to allow for adjustment of the golf cart attachment member 54 with respect to the connecting rod 26. In an alternate embodiment (not shown), the second telescoping member 60 is provided with a plurality of openings 62. In a further alternate embodiment illustrated in FIGS. 5 and 6, two openings 62 are provided such that one or both cooperate with openings 110 defined by a golf cart handle attachment member 90 provided on a convention golf cart 16 to secure a handle 20 thereto. This latter embodiment is described in greater detail below.

The clamping assembly 66 of the preferred embodiment is most clearly illustrated in FIG. 4. This figure is an exploded view showing the individual components of one embodiment of the clamping assembly 66. A pair of pads 68 fabricated from a compressible material such as plastic or rubber are provided for engaging the selected location on the frame 18 of the golf cart 16. As illustrated in FIG. 1, the golf cart 16 may be engaged on the support frame 18 thereof. As illustrated in FIG. 2, the golf cart 16 may be engaged on a handle 20 thereof. It will be recognized by those skilled in the art that other locations on the golf cart 16 or golf bag 24 may be engaged as well.

The compressible pads 68 each define a notched or recessed portion 70 defining a configuration substantially similar to the configuration of the selected location on the golf cart 16 to be engaged. Illustrated are arcuate recesses 70 to conform to a golf cart frame 18 or handle 20 having a circular cross-section. It will be understood that for a square or rectangular cross-section, the recesses 70 define a rectangular configuration. To this extent, the compressible pads 68 are removable to be replaced with compressible pads 68 defining recesses 70 of varying sizes and configurations. The compressible pads 68 define a thickness such that when engaged with the golf cart frame 18 or handle 20 without being compressed, the compressible pads 68 do not engage one another. Specifically, the total depth of both recesses 70 is less than the diameter of the golf cart frame 18 or handle 20 in the event of a circular cross-section, and less than the depth of the golf cart frame 18 or handle 20 in the event of a square or rectangular cross-section.

Each of the compressible pads 68 defines at least one opening 72 which registers with one opening 72 defined by the other. Illustrated are two openings 72 defined by each of the compressible pads 68, with one opening 72 being disposed on either side of the recess 70. First and second brackets 74,78 are disposed on opposite sides of the compressible pads 68 such that pressure may be applied between the brackets 74,78 to compress the compressible pads 68 and thus secure the golf cart attachment member 54 to the golf cart 16. To this extent, a threaded pin 80 is secured to each of the first and second brackets 74,78 to be received through one of the pairs of registered openings 72. Each bracket 74,78 defines an opening 88 for receiving a portion of the threaded portion 82 of the threaded pin 80 carried by the other of the brackets 78,74.

Handles 84, each defining a threaded receptor 86, are provided for engaging the threaded portions 82 of the threaded pins 80. Thus, the handles 84 are used to apply compression forces to the compressible pads 68. Due to the configuration of the illustrated handles 84, it is necessary that they are disposed on opposite sides of the clamping assembly 66 as shown. However, it will be understood that other conventional types of threaded receptors (i.e., hex nuts, wing nuts, etc.) may be used which will allow both of the threaded pins 80 to be carried by the same bracket 74,78. Therefore, it will be understood that the present disclosure is not intended to limit the invention to the illustrated embodiment.

The first bracket 74 of the illustrated embodiment is provided with an angled leg 76 to which is secured the second telescoping member 60. The securement of the second telescoping member 60 to the first bracket 74 may be accomplished in any conventional method such as welding. Other, less permanent methods of securement may be incorporated as well.

Thus, it will be seen that three basic attachments are made to secure the golf cart 16 behind a bicycle 12. First, the bicycle attachment member 32 is secured to the bicycle seat post 14 as described. Second, the clamping assembly 66 of the golf cart attachment member 54 is secured to the golf cart 16 at a selected location. Finally, the first and second telescoping members 56,60 are received one within the other and secured with a locking pin 64. At this point, the golfer may ride the bicycle 12 and pull the pull-type golf cart 16 behind. After the golfer is finished playing, the bicycle attachment member 32 is disengaged from the seat post 14 and the first and second telescoping members 56,60 are disengaged one from the other. The golf cart attachment member 54 may be left in engagement with the golf cart frame 18 or handle 20 such that when the golfer desires to use the trailering device 10 again for the same golf cart 16, time is saved in setup. It will be seen that the golf cart 16 may be pulled manually while the golf cart attachment member 54 is in place without impeding the ability of the person so pulling.

FIGS. 5 and 6 illustrate an alternate embodiment of the trailering device 10 of the present invention. In this embodiment, the golf cart attachment member 54' is comprised of a golf cart handle attachment member 90 provided with a conventional golf cart 16. The golf cart handle attachment member 90 is secured to the golf cart frame 18 at a selected location in a conventional fashion with a clamping device 92. A handle 20 is typically secured to the golf cart handle attachment member 90 between first and second mounting brackets 98,104. A pitch adjuster 106 is provided for adjusting and fixing the pitch of the handle 20 with respect to the golf cart 16. To this extent, the pitch adjuster 106 is typically comprised of extended portions 94,100 defined by the clamping device 92 and the first mounting bracket 98, respectively. The respective extended portions 94,100 are provided with cooperating textured faces 96,102 oriented to engage one another. A fastener 108 such as a bolt and wing nut is provided for securing the relative positions of the engaged faces 96,102 and thus the pitch of the handle 20 with respect to the golf cart 16. The handle 20 is maintained within the first and second mounting brackets 98,104 via conventional fasteners 112.

In the embodiment illustrated in FIGS. 5 and 6, the fasteners 112 are removed from the first and second mounting brackets 98,104, thus removing the handle 20. The handle 20 is then replaced with the first telescoping member 56, or the distal end 30 of the connecting rod 26. At least one of the openings 62 defined by the first telescoping member 56 are aligned with the openings 110 provided by the first and second mounting brackets 98,104. The fasteners 112 are then replaced, thus securing the trailering device 10 to the golf cart frame 18.

From the foregoing description, it will be recognized by those skilled in the art that a bicycle attachment for trailering a pull-type golf cart offering advantages over the prior art has been provided. Specifically, the trailering device provides a means for quickly and easily securing a pull-type golf cart to the seat post of a bicycle such that as the golfer rides between shots, the golf cart is pulled behind. Thus, the golfer is provided with physical exercise when moving from shot to shot while the typical awkwardness of pulling or pushing a golf cart is alleviated.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. A bicycle attachment for trailering a pull-type golf cart behind a bicycle, the pull-type golf cart including a frame and being supported by a plurality of wheels, the bicycle including a seat post for supporting the seat, said bicycle attachment comprising:

a connecting rod defining a proximal end and a distal end;

a bicycle attachment member secured to said proximal end of connecting rod and pivotally and releasably securable to the seat post of the bicycle, said bicycle attachment member limiting movement of said connecting rod to pivotal movement about the axis of the seat post when the bicycle attachment member is releasably secured to the seat post; and a golf cart attachment member secured to said distal end of said connecting rod and releasably securable to the golf cart at a selected location.

2. A bicycle attachment for trailering a pull-type golf cart behind a bicycle, the pull-type golf cart including a frame and being supported by a plurality of wheels, the bicycle including a seat post for supporting the seat, said bicycle attachment comprising:

a connecting rod defining a proximal end and a distal end;

a bicycle attachment member secured to said proximal end of said connecting rod and pivotally and releasably securable to the seat post of the bicycle; and a golf cart attachment member secured to said distal end of said connecting rod and releasably securable to the golf cart at a selected location, said golf cart attachment member including a securement mechanism and a clamping mechanism, said securement mechanism being provided for releasably securing said clamping mechanism to said connecting rod distal end, at least a portion of said securement mechanism being carried by said clamping mechanism, said clamping mechanism being releasably securable to the golf cart.

3. The bicycle attachment of claim 2 wherein said securement mechanism is comprised of at least a first telescoping member secured at one end to said connecting rod distal end and a second telescoping member secured at one end to said clamping mechanism, said second telescoping member being received within and releasably secured to said first telescoping member.

4. The bicycle attachment of claim 2 wherein said clamping mechanism is comprised of first and second pad members disposed on opposite sides of the selected location of the golf cart, first and second brackets positioned such that said first and second pad members are disposed therebetween, and a fastening device for applying pressure through said first and second brackets to said first and second pads to secure a position of said clamping mechanism with respect to the golf cart.

5. The bicycle attachment of claim 4 wherein said at least a portion of said securement mechanism is secured to said first bracket.

6. The bicycle attachment of claim 4 wherein said first and second pads each define a recess at a point of contact with the golf cart, said recess defining a configuration substantially similar to the configuration of the perimeter of the selected location of the golf cart.

7. The bicycle attachment of claim 4 wherein at least one registered opening is defined by said first and second pad members and at least one of said first and second brackets, said clamping mechanism further including at least one threaded pin and at least one threaded receptor, said at least one threaded pin being received through said at least one registered opening, said at least one threaded receptor being provided to engage a threaded portion of said at least one threaded pin.

8. The bicycle attachment of claim 7 wherein said at least one threaded pin is secured to one of said first and second brackets.

9. The bicycle attachment of claim 7 wherein a first registered opening is defined by said first and second pad members and said first bracket, and a second registered opening is defined by said first and second pad members and said second bracket, said clamping mechanism including first and second threaded pins and first and second threaded receptors, said first threaded pin being carried by said first bracket, received through said second registered opening, and engaged by said first threaded receptor, said second threaded pin being carried by said second bracket, received through said first registered opening, and engaged by said second threaded receptor, each of said first and threaded receptors being provided with a grasping portion for rotation thereof about said first and second threaded pins, respectively, by a person's hand.

10. A bicycle attachment for trailering a pull-type golf cart behind a bicycle, the pull-type golf cart including a frame and being supported by a plurality of wheels, the bicycle including a seat post for supporting the seat, said bicycle attachment comprising:

a connecting rod defining a proximal end and a distal end;

a bicycle attachment member secured to said proximal end of connecting rod and pivotally and releasably securable to the seat post of the bicycle; and a golf cart attachment member secured to said distal end of said connecting rod and releasably securable to the golf cart at a selected location, said golf cart attachment member including a securement mechanism and a clamping mechanism, and securement mechanism including at least a first telescoping member secured at one end to said connecting rod distal end and a second telescoping member secured at one end to said clamping mechanism, said second telescoping member being received within and releasably secured to said first telescoping member, said clamping mechanism being releasably securable to the golf cart.

11. The bicycle attachment of claim 10 wherein said clamping mechanism is comprised of first and second pad members disposed on opposite sides of the selected location of the golf cart, first and second brackets positioned such that said first and second pad members are disposed therebetween, and a fastening device for applying pressure through said first and second brackets to said first and second pads to secure a position of said clamping mechanism with respect to the golf cart.

12. The bicycle attachment of claim 11 wherein said at least a portion of said securement mechanism is secured to said first bracket.

13. The bicycle attachment of claim 11 wherein said first and second pads each define a recess at a point of contact with the golf cart, said recess defining a configuration substantially similar to the configuration of the perimeter of the selected location of the golf cart.

14. The bicycle attachment of claim 11 wherein at least one registered opening is defined by said first and second pad members and at least one of said first and second brackets, said clamping mechanism further including at least one threaded pin and at least one threaded receptor, said at least one threaded pin being received through said at least one registered opening, said at least one threaded receptor being provided to engage a threaded portion of said at least one threaded pin.

15. The bicycle attachment of claim 14 wherein said at least one threaded pin is secured to one of said first and second brackets.

16. The bicycle attachment of claim 14 wherein a first registered opening is defined by said first and second pad members and said first bracket, and a second registered opening is defined by said first and second pad members and said second bracket, said clamping mechanism including first and second threaded pins and first and second threaded receptors, said first threaded pin being carried by said first bracket, received through said second registered opening, and engaged by said first threaded receptor, said second threaded pin being carried by said second bracket, received through said first registered opening, and engaged by said second threaded receptor, each of said first and threaded receptors being provided with a grasping portion for rotation thereof about said first and second threaded pins, respectively, by a person's hand.

17. A bicycle attachment for trailering a pull-type golf cart behind a bicycle, the pull-type golf cart including a frame and being supported by a plurality of wheels, the bicycle including a seat post for supporting the seat, said bicycle attachment comprising:

a connecting rod defining a proximal end and a distal end;

a bicycle attachment member secured to said proximal end of said connecting rod and pivotally and releasably securable to the seat post of the bicycle; and a golf cart attachment member secured to said distal end of said connecting rod and releasably securable to the golf cart at a selected location, said golf cart attachment member including a securement mechanism and a clamping mechanism, said securement mechanism including at least a first telescoping member secured at one end to said connecting rod distal end and a second telescoping member secured at one end to said clamping mechanism, said second telescoping member being received within and releasably secured to said first telescoping member, said clamping mechanism being releasably securable to the golf cart, said clamping mechanism including first and second pad members disposed on opposite sides of the selected location of the golf cart, first and second brackets positioned such that said first and second pad members are disposed therebetween, first and second threaded pins, and first and second threaded receptors, a first registered opening being defined by said first and second pad members and said first bracket, a second registered opening being defined by said first and second pad members and said second bracket, said first threaded pin being carried by said first bracket, received through said second registered opening, and engaged by said first threaded receptor, said second threaded pin being carried by said second bracket, received through said first registered opening, and engaged by said second threaded receptor, each of said first and threaded receptors being provided with a grasping portion for rotation thereof about said first and second threaded pins, respectively, by a person's hand.

18. The bicycle attachment of claim 17 wherein said at least a portion of said securement mechanism is secured to said first bracket.

19. The bicycle attachment of claim 17 wherein said first and second pads each define a recess at a point of contact with the golf cart, said recess defining a configuration substantially similar to the configuration of the perimeter of the selected location of the golf cart.

20. A bicycle attachment for trailering a pull-type golf cart behind a bicycle, the pull-type golf cart including a frame and being supported by a plurality of wheels, the bicycle including a seat post for supporting the seat, said bicycle attachment comprising:

a connecting rod defining a proximal end and a distal end;

a bicycle attachment member secured to said proximal end of said connecting rod and pivotally and releasably securable to the seat post of the bicycle, said bicycle attachment member limiting movement of said connecting rod to pivotal movement about the axis of the seat post when the bicycle attachment member is releasably secured to the seat post; and a golf cart attachment member secured to said distal end of said connecting rod secured to the golf cart at a selected location.

* * * * *